JOHN H. NALE.
Improvement in Cotton-Planters.

No. 126,320.  Patented April 30, 1872.

Witnesses:  Inventor:

126,320

UNITED STATES PATENT OFFICE.

JOHN H. NALE, OF MEMPHIS, TENNESSEE, ASSIGNOR OF ONE-HALF HIS RIGHT TO CHARLES COLLINS, OF SAME PLACE.

IMPROVEMENT IN COTTON-PLANTERS.

Specification forming part of Letters Patent No. 126,320, dated April 30, 1872.

SPECIFICATION.

*To all whom it may concern:*

Be it known that I, JOHN H. NALE, of Memphis, in the county of Shelby and in the State of Tennessee, have invented certain new and useful "Improvements in Cotton-Seed Planters;" and I do hereby declare that the following is a full, clear, and exact description thereof, reference being had to the accompanying drawing and to the letters of reference marked thereon.

The nature of my invention consists in constructing a cotton-seed planter with its hopper provided with hinged gates, operated by rope and pulley, that (aided by a stirrer) prevent "bridging," as will be more fully hereinafter described; all of which will be more specifically set forth below, in order to enable those skilled in the arts to make and use my invention.

Figure 3:
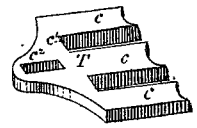
Figure 1:
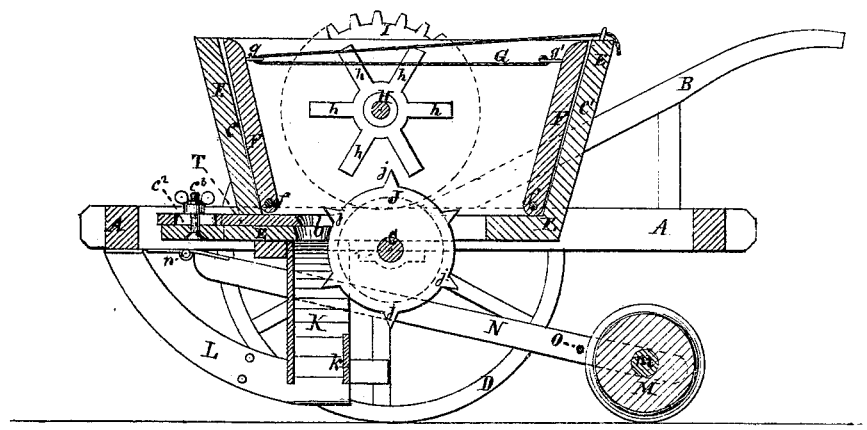
Figure 2:
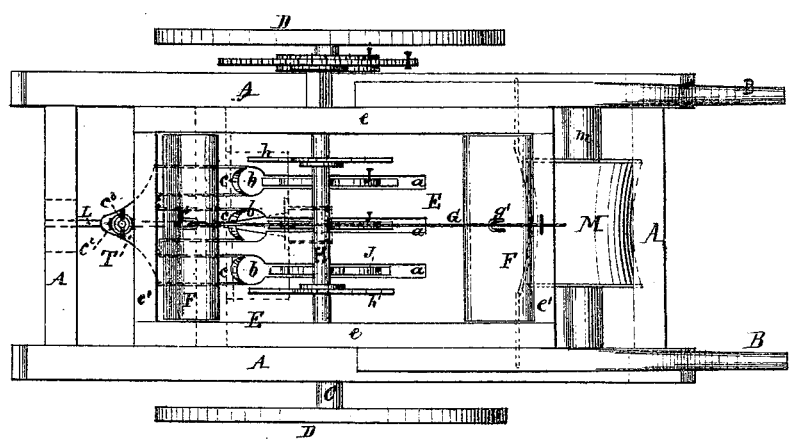

In the drawing, Figure 1 is a longitudinal vertical detail section of my cotton-seed planter. Fig. 2 is a plan view of my invention; and Fig. 3 is a perspective detached view of the seed-drop regulator or slide.

A indicates the rectangular frame; B, the handles; C, the axle; and D, the driving-wheels, firmly secured to the axle, so as to cause it to revolve when they do. E is the hopper. $e\ e$ are its sides, which are vertical because of the supernumerary ends or gates F situated at the ends $e'\ e'$ of the hopper, which are inclined in the usual manner. Gates F are hinged to the hopper's bottom, as shown at $f\ f$, Fig. 1, and by means of the cord or rope G, (which is attached in a ring, $g'$, on the rear gate, and passes thence through a similar ring or pulley, $g$, on the front gate to the rear of the hopper, within the reach and control of the operator, who secures it in any suitable manner to the hopper,) the gates F are swung toward each other and the center of the hopper. The gates are thus operated when it is desired to force the seed to the center of the hopper, within reach of the seed-saws J. H is the stirrer-shaft, and $h\ h\ h\ h\ h$ are the stirrer's arms or spokes, which assist gates F in throwing the seed on the seed-saws J. Shaft H has its journals in sides $e\ e$ of the hopper, and is rotated by means of the gear-wheel I attached to one of its ends, that is driven by the gear-wheel $i$ on axle C. (See Fig. 2.) At the bottom of the hopper there are three long and narrow slots, $a\ a\ a$, extending from end to end of the hopper. These slots terminate near the front end of hopper in oblong countersunk seed-holes $b\ b\ b$. (See Fig. 2.) There is a groove cut in the bottom of the hopper from the front end of each of the seed-holes $b$ to the front end of the machine, and of the same width as said holes, and to receive and guide an arm, $c$, of the slide T. Said arms $c$ are united in a head, $c^1$, of the slide T, outside of the hopper, and have their ends, which partly cover the seed-holes $b$, of the same curvature, or are concave, as shown in Figs. 2 and 3. By sliding the slide T the arms $c$ cover or uncover the seed-holes $b$, and so regulate the quantity of the seed dropped at any one time. A slot, $c^2$, (see Fig. 3,) in the head $c^1$ of the slide T, allows a set-screw, $c^3$, to pass through the slide, and permits it to be slid forward or backward, as desired. When the slide is in the position desired to regulate the seed-drop the set-screw $c^3$ is caused to firmly secure the slide to the bottom of the hopper. The seed-saws J J J are suitably mounted on the axle C, and project up through the slots $a\ a\ a$ to a height several inches above the bottom of the hopper. These seed-saws are so arranged in relation to each other that each tooth of a saw takes seed enough out of the hopper for one drop after a tooth on each of the other saws has dropped seed. The teeth $j$ of these seed-saws are placed wide apart, (see Fig. 1,) and at such a distance as will allow the requisite space between any two droppings being traveled over before a succeeding dropping is dropped. By enlarging the diameter of the seed-saws they could be arranged so that their teeth could act together, and not independently, as they do as above set out. If this were done the distance between the teeth should also be increased; or I could use one, or more than three saws, if thought desirable; but I shall ordinarily and preferably use three saws, substantially as just described. Below the seed-holes $b\ b\ b$ is the inlet of the seed-spout K, that is attached to the cross-tie A' (see Fig. 1) of the frame. This inlet is somewhat wider than the seed-holes $b$ are long, and is longer than the greatest distance between any part of the extreme right and any part of the extreme left seed-holes b, as is shown by the rectangle formed by dotted lines in Fig. 2, and marked y y. The right and left sides of the seed-spout K incline toward each other and the ground, and this inclination is indicated in Fig. 1 by "shading lines," while the front and rear sides are vertical, (see same figure.) I leave the upper portion of the rear side sufficiently open to allow the seed-saws J to move unobstructedly in their course through the upper part of spout K, although not leaving the whole of this side open, but closing the lower end of this side, as indicated at k in Fig. 1. An outlet for the seed to drop through to the drill is provided at the lower end of the seed-spout, directly under the center of the rectangle y y, Fig. 2. L is the drill-opener, of colter-like shape, attached to the front lower end of spout K, and extending in a curve forward and upward to the front cross-tie of the frame A, where it is also fastened. The drill-opener L is as wide at the point of its attachment to the seed-spout as it is ordinarily desirable to make the drill, and tapers from the spout K toward the middle of the drill-opener, its front and lower edge being more or less sharp. M is the seed-roller or coverer on a shaft, m, that has journals in the trailing ends of two drag-bars, N, (only one of which is shown, and that is in Fig. 1,) which are hinged to the front under sides of the sides of frame A. (Only one hinge is shown, and that is at n, Fig. 1.) Between these bars N there extends an iron rod, O, (shown in dotted lines, Fig. 2, and a cross-section in Fig. 1,) which conforms, near its middle portion, to the concavity of the periphery of roller M, and is really a scraper or cleaner for said roller. As the drill-opener L forms a drill whose cross-section is V-shaped, the concave periphery of the seed-roller M is peculiarly adapted to close such a shaped drill.

To operate my invention when thus constructed, the parts of the machine are in the relative positions illustrated in the drawing. The slide T having had its arms c slid so as to uncover as much of the seed-holes b as is necessary to determine the quantity of the seed-drop, and the set-screw $c^3$ turned down to hold fast the slide, the hopper E is filled with cotton-seed, and the team is hitched to the front of the frame A and started by the driver or operator. The driving-wheels D, with axle C, then revolve, and as they turn, they, through means of gear-wheels I i, cause the shaft H and arms h of stirrer to rotate and throw the seed onto the seed-saws J, which are now also in motion. Each tooth j, as it runs through the mass of seed that are sticking or are matted together because of the cotton fiber that adheres to each seed, rips or tears some of the seed from the mass of seed, and forces them through the seed-hole b in such quantity or number as the regulated size of the hole will permit. The first tooth of one of the saws having torn and forced one seed-drop through the seed-hole into the seed-spout K, this first seed-drop will be conveyed into the drill made a moment before by drill-opener L; and after this drop is in the drill the machine will travel over the distance equal to the space required between the drops, and then a tooth on each of the other saws will successively act in their positions in like manner as the first tooth of the saw first described, and before the second tooth of said saw acts. The coverer M then passes over the drill, and the sides of the V-shaped coverer are compressed together over and down on the dropped seed. After a considerable portion of the seed has been planted, what seed remains in the hopper will be, by action of the seed-saws, more toward the ends of the hopper, and the seed will also yield as a mass to the action of the saws, or form a "bridge," and stand up out of the way of the saws' teeth, because the quantity of seed is less, and therefore the weight of the mass is less, and no longer sufficient to overcome the adhesive strength of the cotton fiber, and force the seed into the saws' teeth, so as to enable them to tear the number of seed needed for a drop. When this "bridging" occurs the operator pulls the cord G, and that swings the gates F toward the center of the hopper, thereby throwing and forcing the whole mass of seed on the saws, and at once destroying the "bridging." By use of the handles B the operator guides the planter in the mode usually followed.

Having thus fully described my invention, what I claim as new, and desire to secure by Letters Patent, is—

The hinged gates F, in combination with the stirrer, when constructed and operating substantially in the manner and for the purpose specified.

In testimony that I claim the above-described certain new and useful "improvements in cotton-seed planters" I have hereunto signed my name, this 29th day of February, 1872.

J. H. NALE.

Witnesses:
  W. R. CUNNINGAAM,
  M. B. TREZEVANT.